United States Patent [19]

Murakami et al.

[11] 4,368,210

[45] * Jan. 11, 1983

[54] INSTANT-COOKING DRY MACARONI AND LIKE DRY FOODS

[75] Inventors: Sanpei Murakami, Osaka; Sadao Kokeguchi, Ibaragi; Hiroshi Takahashi, Suita; Ken Okada, Osaka, all of Japan

[73] Assignee: Kanebo Foods, Ltd., Tokyo, Japan

[*] Notice: The portion of the term of this patent subsequent to Jan. 6, 1998, has been disclaimed.

[21] Appl. No.: 201,192

[22] Filed: Oct. 27, 1980

Related U.S. Application Data

[63] Continuation-in-part of Ser. No. 3,934, Jan. 16, 1979, Pat. No. 4,423,690.

[30] Foreign Application Priority Data

Jan. 19, 1978 [JP] Japan ................................. 53-4865

[51] Int. Cl.$^3$ .............................................. A23L 1/16
[52] U.S. Cl. .................................................. 426/557
[58] Field of Search ................ 426/557, 451, 242, 511

[56] References Cited

U.S. PATENT DOCUMENTS 3,718,480  2/1973  Cunningham ........................ 426/557
3,846,563 11/1974  Tremblay et al. ................... 426/242

*Primary Examiner*—Raymond N. Jones
*Assistant Examiner*—Elizabeth A. Hatcher
*Attorney, Agent, or Firm*—Cushman, Darby & Cushman

[57] ABSTRACT

Instant-cooking dry macaroni-type food products are disclosed composed of wheat flour and substantially pre-cooked such that at least 85% of the starch contained in the product is converted to the α-phase, as measured by the diastase enzyme process. The products are characterized by numerous large diameter interconnected pores that provide communication between the external surfaces and the internal portions of the pieces and allow rapid hydration and conversion of the product from the dry to the cooked and edible state.

10 Claims, 10 Drawing Figures

INSTANT-COOKING DRY MACARONI AND LIKE DRY FOODS

CROSS REFERENCE TO RELATED APPLICATIONS

This application is a continuation-in-part of our earlier application Ser. No. 3,934 filed Jan. 16, 1979 now U.S. Pat. No. 4,243,690.

BACKGROUND OF THE INVENTION (a) Field of the Invention

The present invention relates to instant-cooking dry macaroni and like macaroni-type food products.

(b) Description of the Prior Art

In the past, macaroni products, including spaghetti and vermicelli, have been produced by adding water to starch components consisting mainly of strong wheat flour such as Semolina of the Durum wheat family, uniformly distributing the added water throughout the starch components by kneading the mixture, and thereafter by extracting the kneaded mixture under pressure to shape the material into individual macaroni-shaped pieces or products of any desired shape, and then drying them for a substantially long period of time, often as long as 24 hours. Such macaroni products have and continue to be widely sold in the market.

However, these well known foods are not given an $\alpha$-conversion treatment during their manufacturing process. Accordingly, when prepared for consumption these products must be boiled for a substantial length of time, say from 10 to 15 minutes, in order to cook the starch before being served. Thus, these known products are of the instant- or quick-cooking type that can be instantly cooked or transformed into an edible state before serving.

As for those macaroni products which are marked as instantly cookable foods, macaroni products are known which are produced by first subjecting formed raw macaroni pieces to a boiling treatment for $\alpha$-conversion of the starch components, and by packing the boiled macaroni pieces in a heat-resistant film or like wrapping sheet, and thereafter subjecting the packed macaroni to a heating-and-pasteurizing step. Also known are macaroni products produced by a manufacturing process similar to that stated above, except that the packed macaroni is subjected to a freezing step at a temperature of about $-30°$ C.

These known instant-cooking macaroni products which have been subjected to a heating-and-pasteurizing step during their manufacturing process can be instantaneously cooked and served only by heating them in hot water or through a similar heating means. However, because these macaroni products having a fairly high content of water, there is the disadvantage that the $\alpha$-converted starch components are subjected to $\beta$-conversion during storage, and that when the instantly cooked macaroni are served, the person eating them obtains a sense, feel and taste as if the cooked macaroni are not sufficiently boiled and feel like raw wheat flour. This is caused by $\beta$-conversion which arises during storage. Thus these known instant-cooking macaroni products are poor in sense, feel and taste when eaten, and in addition thereto, when these known macaroni products are stored for more than a week at room temperature, mold tends to develop on the product, and accordingly they cannot be considered storage stable for an extended period of time.

On the other hand, those products subjected to freezing temperature are superior to those subjected to heating-and-pasteurizing treatment with respect to stability of quality during storage for an extended period of time. However, such frozen products require the additional troublesome step of passing the boiled macaroni through a low-temperature zone. Additionally these frozen macaroni products have the further disadvantage that, as with the heated-and-pasteurized macaroni, the once $\alpha$-converted starch components become $\beta$-converted during the period in which the macaroni products are defrosted prior to being served, and that thus they give a similar raw wheat flour-like sense, feel and taste when the instantly cooked macaroni are eaten.

Also U.S. Pat. No. 3,537,862 describes a method of obtaining $\alpha$-converted pasta by mixing wheat flour and/or other grain powder with water, followed by extruding the mixture directly through a die to form a pasta, and then steaming this pasta at an appropriate temperature while applying hot water thereto, and thereafter drying the product. This known method is suitable for reducing the time required for drying, as viewed from the aspect of manufacture alone, since the pasta is subjected to steaming. Also, this method is able to eliminate the development of muddiness of the surfaces of the product which, otherwise, would be caused by the exudation of those starch components which takes place when the pasta is boiled prior to being served to a consumer. However, the product obtained according to this known method requires that the product be boiled to elevate the $\alpha$-conversion to the requisite edible level in order to serve to the consumer, and thus this product cannot be rendered to an edible state during a very short period of time by immersion in hot water. If, however, it is intended to elevate the $\alpha$-conversion degree of the pasta to solve such inconvenience as stated above, adjacent portions of products tend to stick to each other and also the shape of the pasta tends to deform during the steaming thereof, resulting in uneven $\alpha$-conversion. As a result, such a product will not transform uniformly to the edible state when immersed in hot water, and accordingly will fail to give the consumer a good sense, feel and taste. As such, this known method does not attain the object of the present invention. Additionally large numbers of pasta pieces stuck together is generally unacceptable to the consumer.

Furthermore, there is known a manufacturing method of obtaining $\alpha$-converted pasta by mixing, without heating, wheat flour and water, and extruding the resulting mixture dough under a high temperature and high pressure, and thereafter drying same, as stated in U.S. Pat. No. 4,044,165. However, this method requires high temperature extrusion of the flour-water mixture in order to enhance the degree of $\alpha$-conversion of the product. Also the water contained in the material boils during the extrusion process, causing extensive expansion of the material, leading to an uneven configuration of the final product, resulting in a marked lowering of the commodity value of the product. Furthermore, under such heating condition, no sufficient $\alpha$-conversion degree of the product can be attained, and therefore the product will not be rendered to an edible state by its mere immersion in hot water. If, therefore, the amount of the water added is decreased at the time of mixing to prevent the occurrence of this expansion, this results in a shortage of water in the mixture which is necessary for effecting the required degree of α-conversion, leading to the result that the degree of α-conversion of the extruded product becomes low. This, in turn, will give to the consumer a feeling like raw wheat flour even when the product is transformed to edible state by immersion in hot water. Thus, the product so obtained has the disadvantage represented by a loss of good sense, feel and taste. As such, this procedure is unable to attain the objects of the present invention.

These known products, sometimes labeled as instant-cooking macaroni products, generally further have the disadvantage that when hot water is poured onto the macaroni products, they tend to cause the hot water to become turbid and cloudy in the cooking water due to partical exuding or dissolving of starch components in the hot water, resulting in a loss of good shape of the individual pieces of macaroni as well as a loss of sense, feel and taste. In some cases the macaroni pieces immersed in hot water tend to stick to each other locally.

As stated, the known instant-cooking macaroni products have various disadvantages and inconveniences. The present invention provides a macaroni-type product free from such difficulties.

The present inventors, therefore, have conducted research and many experiments to resolve the foregoing problems encountered in the prior art, and as a result they have arrived at the present invention based on their discovery that, by first forming a granular mixture of grain flour consisting mainly of wheat flour, especially of Semolina flour of the Durum wheat family, while avoiding to the extent possible causing the mixture to become kneaded during the mixing step, a fully acceptable product is obtained. At the same time the water content of the mixture is adjusted so as to be in the range of 25 to 40% by weight, relative to the weight of the starch-containing components of the mixture, and the mixing is continued until the granules of the mixed material are distributed evenly throughout the body of the mixture. Thereafter the mixture is subjected to a preliminary steaming to bring about an α-conversion degree of the starch-containing components of the mixture of from 60% to 80%. In addition the reticulate structure of the protein, i.e. gluten, contained in the mixture becomes fixed as this gluten progressively undergoes denaturalization due to the application of heat during the steaming step resulting in those parts of the starch-containing components which have become glue-like becoming enclosed in the reticulate structure. This inhibits the granules from exuding to adhere to the surface of the mixture, which means that the surfaces of the subsequently molded macaroni products do not become sticky.

The present inventors have also found that this reticulate structure of gluten contributes to the formation of a product having an appropriate degree of viscosity and resiliency of the molded macaroni pieces and a desirable texture thereof. When the material is appropriately shaped into individual molded pieces by means of, for example, an extruder, there occurs no development of phenomenon such as the surfaces of the individual molded pieces of macaroni locally sticking to each other or that the configuration of the molded pieces will become deformed. These problems have been encountered in conventional foods which have been caused by excessive α-conversion during the boiling step in the manufacturing process.

The present inventors have further found that, through their process, there can be obtained molded products of individual macaroni pieces which are uniform in configuration relative to each other, which do not develop muddiness on the surfaces of the individual molded pieces and which are free of stickiness between contacting portions of these molded pieces.

The present inventors have also found that, even when the surfaces of the molded pieces which have been preliminarily steamed for an α-conversion degree of from 60 to 80% are contacted with water and when these water-carrying pieces of the material are subjected to further steaming until an α-conversion of the starch-containing components of at least 85% is reached, in order to enhance the ability to these molded pieces to be instantaneously rendered to an edible cooked state, no exudation of the remaining starch-containing components occurs. This exudate is of a glue-like nature, and thus avoiding the exudate during this further steaming no sticking between portions of the individual molded pieces occurs nor are the pieces deformed. Further a uniform α-conversion is established throughout the pieces. This means that the material does not stick onto the surfaces of the molding apparatus, and that uniform molded pieces can be obtained.

By drying the resulting molded pieces of material, the dried pieces are found to possess a fine porous structure having a pore diameter of 5.0–20.0 microns, which structure enables them to be transformed very quickly to an edible cooked state by immersion in hot water of about 85° C. or higher for a period of 5 minutes or less. Thus, there are obtained instant-cooking dry macaroni and like macaroni-type products which exhibit good sense, feel and taste when eaten, and which are storage stable when stored for an extended period of time, for instance for a period over one year.

SUMMARY OF THE INVENTION

A primary object of the present invention is to provide instant-cooking dry macaroni and like macaroni-type products which solve the disadvantages, inconveniences and problems mentioned above of the prior art foods and which eliminate mutual sticking between shaped individual pieces as well as deformation of these pieces that might otherwise occur during the manufacturing process.

Another object of the present invention is to provide an instant-cooking dry macaroni and like macaroni-type products which foods have a physical appearance like unprecooked macaroni-type products as evidenced by a uniform individual configuration, smooth surfaces and are free-flowing.

Still another object of the present invention is to provide instant-cooking dry macaroni products which foods are capable of being transformed quickly to an edible cooked state by immersion in hot water, and which edible foods exhibit a satisfactory sense, feel and taste to the consumer when eaten.

A further object of the present invention is to provide instant-cooking dry macaroni products and which foods have excellent storage stability when stored for an extended period of time without deterioration of the quality of the dry food products.

We have discovered, and hereby disclose, a quick-cooking dry macaroni-type convenience food product that is readily converted to an edible, cooked state by immersion into hot water, for instance about 85° C. for a period of 5 minutes, that retains virtually all of the taste, feel and consistency of conventionally cooked like pasta products. Our products are characterized by a network of pores extending from the surface of the product into the interior to allow communication between the surface and the interior. This communication allows the product to be fairly rapidly and conveniently rehydrated to the soft edible state.

Wheat flour is the sole or principle starch-containing component, although other grain flours and/or starches may be included as well. During processing the starch is essentially completely cooked, as measured by the degree of α-conversion, so that upon immersion in hot water rehydration of the product occurs and a cooked, fully edible food is provided. The hot water immersion thus is not used to cook the starch but rather to rehydrate the product.

DESCRIPTION OF THE PREFERRED EMBODIMENTS

Figure 1:
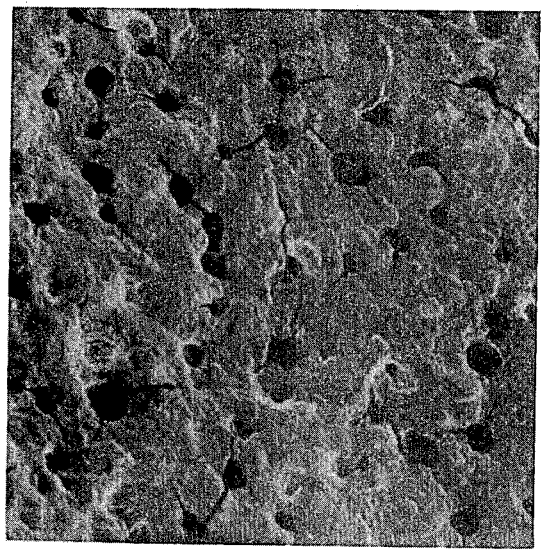
FIGS. 1 and 2 are electron microscopic photographs showing the external surface and cross-section, respectively, of a piece of instant-cooking dry macaroni according to the present invention and produced by Example 1.

Each of the pieces of macaroni obtained according to the present invention has a tubular configuration with an outer diameter of 0.11–0.27 inches. Likewise each piece of spaghetti obtained according to the present invention has either a cord-like or a tubular configuration and has a diameter of 0.06–0.11 inches. Vermicelli obtained according to the present invention has a cord-like configuration and has a diameter of 0.06 inch or smaller.

It should be understood that the samples of the dried macaroni pieces used in the sticking tests between individual product pieces are each comprised of 100 g of product, that is, about 200 pieces of product, each being about 20 mm in length.

It will be understood also that the degree of α-conversion as referred to in the specification and appended claims relates to the value obtained by measurements using the diastase enzyme process, as described in more detail below.

The starting material mixture which is employed in the present invention is prepared with starch-containing components consisting of either wheat flour alone or mainly (60% or more) of wheat flour with other grain powders such as rice powders, buckwheat powder, corn powder and the like, starches such as corn starch, potato starch, waxy corn starch, tapioca starch and the like, or mixtures of the two, and water. This mixed starting material has a water content of about 25–40% by weight relative to the weight of the starch-containing components. The component powder or powders are mixed with water to form a granular mixture while at the same time avoiding as much as possible the occurrence that the material will be kneaded during the mixing. Depending on the requirements of the finished product the starting material mixture may also contain a known improving agent for macaroni products such as di-sodium phosphate, or a food additive such as glycerin monostearate.

This raw starting material may also contain, uniformly dispersed therein, sodium chloride in an amount up to 8.0% by weight relative to the weight of the starch-containing components. This sodium chloride is included for the following purposes: to improve the ability of the finished dry macaroni products to transform quickly to the edible boiled or cooked state when immersed in hot water, and to impart the desired taste to the macaroni. If the sodium chloride content is in excess of 8.0% by weight, the macaroni products will become too salty and unacceptable in terms of quality. Also the gluten structure of the macaroni material will be severed apart, making it difficult to form a shaped body of macaroni material.

The water content of the starting mixture, as indicated, should be from about 25 to about 40% by weight. If the water content is less than 25% by weight relative to the weight of the starch-containing components contained in the mixture, the distribution of both water and air in the material becomes non-uniform, and accordingly the viscosity of the constituent substances becomes markedly lowered, whereby the material is rendered to a powdery state. Thus, it becomes impossible to obtain uniformly shaped molded pieces at the time of the molding or shaping step. Also, in the subsequent further steaming stage, which will be described later, uniform swelling will not develop as the α-conversion of the starch-containing components progresses, so that blister-like bubble formation will develop in the surfaces of the molded material, causing the surfaces to become uneven. As a result when immersed in hot water the final dry macaroni products will develop, scraping and cracking of the body of the macaroni, thus substantially detracting from the mouth sense or bite, feel and taste of the macaroni when rendered to the edible state.

On the other hand the water content of the starting material mixture is in excess of 40% by weight, the material becomes undesirably muddy, so that the α-conversion undergoes an excessive progress, that is, the reticulate structure of gluten in the mixture becomes excessively fixed, causing the texture of the material to become a dense, dumpling-like state. This condition of the material will not allow uniform α-conversion during the subsequent preliminary steaming step, and accordingly during the following molding step, sticking between the molded pieces of macaroni will take place, and along with this the fixation of the reticulate structure will be further accelerated, causing the texture to become even more dense. In addition the individual pieces of macaroni will not exhibit a uniform porous structure during the drying step. Thus the dry macaroni, when immersed in hot water, will not be easily rendered to the edible cooked state when being served and will not give the satisfactory bite, feel and taste when eaten.

The starting material mixture may also include viscous binder such as egg yolk or a gum component to increase the viscosity of the components contained in the material. Such an additive serves to prevent blister-like bubble formations from occurring on the surfaces of the material during steaming.

Typical improving and processing agents that may be used include di-sodium phosphate; glycerin monostearate, a surface active agent including glycerin fatty acid ester, sucrose fatty acid ester, sorbitan fatty acid ester and lecithin; a humectant including propylene glycol and D-sorbitol; or other agents including sodium starch phosphate, sodium caseinate, L-lysine hydrochloride, vitamin $B_1$, vitamin $B_2$, chlorella and active gluten. If used the viscous binder may be egg yolk or a water-soluble gum including cellulose sodium glycolate, sodium polyacrylate and sodium alginate. Seasoning agents that may be included are various spices, various extracts, monosodium glutaminate, sodium inosinate, guanylic acid and succinic acid.

The manufacturing process according to the present invention will now be described in detail.

As a first step, the starting material mixture described above is subjected to a preliminary steaming step to effect α-conversion of the starch-containing components contained therein up to a degree of 60–80%. The resulting mixture is then molded into individual pasta, such as macaroni of the desired shape. In order that this preliminary steaming be performed uniformly, it is desirable to render the mixture to a granular or pellet state by the use of an oscillator or like means, and thereafter to distribute the granular constituents uniformly throughout the starting material before being subjected to the preliminary steaming.

If the degree of α-conversion of the starch-containing components is less than 60% in this step, this is not desirable because during the subsequent molding step it may not be possible to obtain molded pieces of macaroni having a uniform configuration. On the other hand, in case the degree of α-conversion of the starch exceeds 80%, there arises a marked physical collapse of the α-converted starch granules during their stay in an extruder which is used in the molding step following the preliminary steaming. As a result, the extruded macaroni product is imparted a marked rubber-like resiliency. Thus, the final product obtained will not be satisfactory when eaten, irrespective of its degree of α-conversion.

For the purpose of preliminary steaming, any known conditions for steaming conventional macaroni or like food material may be employed. However, we have found that it is desirable to bring the mixed material into contact with steam under a gauge pressure of 0.5–1.5 kg/cm$^2$, preferably 0.7–1.2 kg/cm$^2$, for a length of time of about 2–7 minutes. Suitable steaming times and conditions are readily determined by a few experimental runs. This preliminary steaming is carried out until the starch-containing components have an α-conversion degree of from 60 to 80%.

Preliminary steaming is required in order to provide an appropriate fixation of the reticulate structure of gluten as the thermal degeneration of the protein contained in the mixed material makes progress while inhibiting the undesirable exudation of those starch-containing components which have been rendered to a glue-like state. Along with this the resulting material will possess a texture having the appropriate viscosity and resiliency such that when the resulting material is subsequently molded into individual molded pieces, one avoids unacceptable muddiness on the surfaces of the molded pieces, which muddiness is caused by the exudation of the glue-like starch-containing components. In this manner it is possible to obtain molded pieces having a uniform configuration and free from sticking between individual molded pieces. This is one of the features of the product produced by the present invention.

Molding of the mixed material may be carried out by the use of any known molding apparatus known in the food processing art, such as an extruder, a cutter designed for these foods having an appropriate cutting edge or a slit cutter.

Once formed and depending on the product requirements water may be applied onto the surface of the molded and preliminary steamed pieces. These individual molded pieces carrying water on their surfaces are then subjected to further steaming to effect a further α-conversion degree of the starch-containing components of these molded pieces up to at least about 85% and preferably at least about 93%. The resulting pieces are then dried and thus dry macaroni products are obtained.

The optional application of water onto the surfaces of the molded pieces of material is performed so that water is carried thereon in an amount up to at most 100% by weight, preferably about 10 to 50% by weight, relative to the weight of the individual molded pieces. If the amount of the applied water adhering to the surfaces of the molded pieces is in excess of 100% by weight, there will arise the phenomenon of sticking between the individual molded pieces or deformation of the configuration of these pieces at the time of said further steaming, so that when the resulting product pieces are immersed in hot water, their ability to transform into an edible state as well as their bite, feel and taste will become poor. Water is applied to the surfaces of the molded pieces by spraying with a spray gun, water may be sprinkled onto the molded pieces by a shower system, or the molded pieces may be immersed in water. Depending on the necessity, an aqueous emulsion of an edible oil, in place of water, may be used.

As stated, the optional application of water onto the surfaces of the molded pieces will allow a more uniform progress of the α-conversion during the further steaming step, so the resulting dry macaroni products are satisfactory in their ability of being rendered to an edible cooked condition when immersed in hot water and also satisfactory in their bite, feel and taste when eaten. The conditions of this further steaming are similar to those for the preliminary steaming.

In the event that the α-conversion degree of the molded pieces in said further steaming is lower than 85%, it is quite likely that when the dry foods are immersed in hot water to be transformed to an edible state, a raw feeling, as of wheat flour, will remain and this will hamper the desirable sense, feel and taste of the macaroni products when served. We prefer, however, that the product has a degree of α-conversion of at least about 85% and preferably at least 93% to achieve a fully acceptable, delicious product.

The macaroni products of our invention include food products of dried units of dough made from semolina, durum flour, farina, flour, or any combination of these with water and optionally other ingredients such as egg white, disodium phosphate, seasonings such as onion, celery, garlic or bay leaf, gum gluten, sodium chloride (table salt) or concentrated glyceryl monostearate. The products may be tube-shaped macaroni with a hollow interior, cord-shaped spaghetti or the smaller vermicelli, as described in 21 CFR 139.110 (1978) the disclosure of which is hereby incorporated by reference.

Included within our invention is the mouth feel or bite of the so-called "al-dente" cooked pasta condition.

Said further steaming step enhances the instant cookability of the product and obviates any exudation of those starch-containing components which are rendered to a glue-like state during this further steaming step. This is because in the preliminary steaming α-conversion has progressed to a certain extent, which means that the starch-containing components have changed to a glue-like state to a certain extent, and these portions of the starch-containing components are enveloped in the reticular structure of the gluten contained in the material. Mutual sticking and agglutination between the individual molded pieces is avoided and thus uniform α-conversion of the starch-containing components is attained. The resulting molded pieces are dried, and there are obtained instantly cookable dry macaroni pieces having a uniform configuration and a fine porous texture which is formed as the water contained in the molded pieces is caused to evaporate by the heat applied during the drying step.

The conditions for the drying step need not be rigidly controlled since the conditions used will depend on the temperature employed and also on the duration of this step. If expansion of the molded pieces is not desired to produce a porous texture, our experience is to dry these molded pieces usually at a temperature of 55°–110° C. for 10–120 minutes. On the other hand, if the operator wishes to expand the steamed molded pieces during the drying step it is desirable to dry these molded pieces usually at a temperature of 115°–160° C. for 3–20 minutes. In each instance drying is continued until the water content of the molded pieces reaches 13% or less by weight relative to the weight of the molded pieces thus dried. The drying may be conducted in any convenient manner, for instance with the use of heated air, by heating the molded pieces with infrared ray irradiation, heating with micro-waves, or like heating either independently or in combination.

The instant-cooking dry macaroni products of the present invention do not develop mutual sticking between individual pieces nor does the configuration of these pieces deform; a uniform fine porous structure is exhibited throughout. When ready to be served the dry macaroni products can be easily transformed to an edible cooked state in a very short period of time, and give a satisfactory bite, feel and taste. The product is also storage stable for an extended period of time. Thus, the products obtained according to the present invention have a high commercial value, and the present invention can be utilized for a wide range of purposes.

The present invention will now be described with reference to the following examples that are illustrative, but not limiting, of the invention. Unless otherwise indicated parts and percentages are by weight.

Evaluation of the sense, feel and taste of the macaroni products in their edible cooked state, the determination of α-conversion, and the rating of inter-piece sticking are conducted in the manner as stated below.

(1) Evaluation of sense, feel and taste

Dry macaroni pieces (60 g) are placed in a heat-resistant cup to which is added 200 ml of hot water at 95° C. The pieces are allowed to stand for 5 minutes. At the end of 5 minutes the resulting pieces of macaroni are evaluated of their sense, mouth or "bite" feel and taste by a panel of 20 persons. The evaluation points are as follows: 10 (very good); 8 (good); 6 (normal); 4 (poor); and 2 (very poor). These points are shown by the mean values (decimals of over 0.5 inclusive are raised to the next higher number and the rest are ignored). The items relating to the evaluation of the pieces of macaroni product in their edible cooked state when eaten show the number of persons among the 20 persons panel who indicate their feeling about eating the samples.

(2) Degree of α-conversion as determined by diastase enzyme process: Slightly over 20 g of dried macaroni product are directly pulverized; fine powders having a grain size of less than 100 mesh are used. In the measurement, 5 conical flasks of 100 ml are used with respect to one sample and these flasks are referred to as $A_1$–$A_4$ and B. One gram of the abovedescribed adjusted sample, tolerance ±5%, is respectively weighed and placed into each of the $A_1$–$A_4$ flasks. Water (50 ml) is added to each of the five flasks and among them, $A_1$ and $A_2$ are heated and boiled for 15 minutes and then quenched to room temperature in ice water. On the other hand, to $A_1$, $A_3$ and B is added 5 ml of 5% aqueous diastase solution respectively and all the 5 flasks are kept at 37° C.±1° C. for 90 minutes while shaking in a thermostat containing water, after which 2 ml of 1N HCl is added to all the flasks to stop the diastase reaction. The contents of each flask are transferred into a 100 ml flask and 100 ml water is added to each. Each solution is filtered with a dry filter paper, and from the filtrates obtained from the flasks $A_1$–$A_4$ and B, 10 ml of filtrate is fed into a conical flask with a ground glass stopper by a pipette. These filtrates are referred to as $a_1$–$a_4$ and b.

Next a conical flask with a ground glass stopper containing 10 ml of water taken up by a pipette is prepared separately for a blank test. 10 ml of N/10 aqueous solution of iodine is added to each of a total of 6 flasks.

Next 18 ml of N/10 aqueous solution of sodium hydroxide is added to each of the 6 flasks one after another at a same time interval by means of a stop watch and the flask is corked, shaken and then left to stand for exactly 15 minutes. When the first flask has stood for 15 minutes, 2 ml of 10% sulfuric acid is added to the flask in the same order and the same interval as when N/10 aqueous solution of sodium hydroxide was first added, rapidly and as soon as the stopper is opened. These solutions are titrated with N/10 aqueous solution of sodium thiosulfate and the titrated values of $a_1$–$a_4$ and b are referred to as $P_1$–$P_4$ and Q; the titrated value of the blank tast is referred to as r. The α-conversion degree (%) is determined by the following formula:

$$\alpha\text{-conversion degree} = \frac{(r - P_3) - (r - P_4) - (r - Q)}{(r - P_1) - (r - P_2) - (r - Q)} \times 100$$

(3) Rating of the degree of sticking between macaroni pieces: A sample (100 g) of uncooked macaroni pieces is taken at random and the degree of mutual sticking between individual pieces are grossly observed.

EXAMPLE 1

To 500 parts of wheat flour was added a mixed solution of 150 parts of water and 10 parts of sodium chloride, and the mixture was thoroughly mixed in a mixer without causing kneading, to achieve even distribution of the components. Then the resulting mixture was subjected to a preliminary steaming for 5 minutes at the gauge pressure of 1.0 kg/cm² resulting in an α-conversion of 70%. Thereafter, the mixture was extruded through a nozzle of an extrusion-molder to obtain molded pieces each having an outer diameter of 5.5 mm and a thickness of 0.7 mm. The molded pieces were then uniformly sprayed with water with a spray gun causing the water to be carried on the surfaces of the molded pieces in an amount 30% relative to the original weight of the molded pieces. The surface wetted, molded pieces were subjected to a further steaming for 5 minutes at a gauge pressure of 1.0 kg/cm². Then the molded pieces were dried with hot air at a temperature of 100° C. at an air speed of 15 m/sec until the water content of the molded pieces became 7%, and thus instant-cooking dry macaroni according to the present invention were obtained.

EXAMPLE 2

The procedure similar to that of Example 1 was carried out to obtain the instant-cooking dry macaroni product of the present invention except that the surfaces of the preliminarily steamed molded pieces were not treated with water.

Control A

The procedure of Example 1 was repeated to obtain instant-cooking dry macaroni (Control A) except that the preliminary steaming step was omitted.

Control B

The procedure similar to Example 1 was carried out to obtain instant-cooking dry macaroni (Control B) except that the preliminary steaming step was replaced by heating molded pieces in hot air at a temperature of 100° C. at an air speed of 3 m/sec for a total time of 2 minutes.

Control C

The procedure of Example 1 was repeated to obtain instant-cooking dry macaroni except that the further steaming step was omitted.

These products were next evaluated for bite, feel and taste as well as rating of inter-piece sticking were determined and the result is shown in Table 1.

TABLE 1

|  | Examples | | Controls | | |
|---|---|---|---|---|---|
|  | 1 | 2 | A | B | C |
| Degree of inter-piece sticking | none | none | very many | very many | none |
| Sticks to teeth (No. of persons)* | 0 | 0 | 17 | 16 | 18 |
| Insufficient resiliency | 0 | 2 | 19 | 19 | 16 |
| Excessive resiliency | 0 | 0 | 0 | 0 | 1 |
| Lacking smoothness | 0 | 1 | 7 | 3 | 7 |
| Excessively smooth | 0 | 0 | 0 | 6 | 2 |
| Too hard | 0 | 0 | 6 | 2 | 18 |
| Felt like raw wheat flour | 0 | 0 | 16 | 15 | 17 |
| Evaluation when eaten (points) | 10 | 8 | 3 | 4 | 2 |

*Number of persons registering a positive response out of 20 persons evaluating the sample.

As is clear from the result shown above, Examples 1 and 2 (according to the present invention) are superior to Controls A-C with respect to the degree of inter-piece sticking, the ability to transform to an edible state when immersed in hot water, and the sense or "bite", feel and taste of the products.

EXAMPLE 3

A procedure similar to Example 1 was carried out to obtain instant-cooking dry macaroni, except that the water content of the mixture prior to the preliminary steaming step was changed as shown in the top line in Table 2 to range from 25 to 40%, according to the present invention, and below (20%) as well as above (45%) this range for purposes of comparison. The result of the test of the product obtained is shown in Table 2.

TABLE 2

| Water Content (%) | Present Invention | | | Control | |
|---|---|---|---|---|---|
|  | 25 | *30 | 40 | 20 | 45 |
| Degree of inter-piece sticking | none | none | none | none | very many |
| Sticks to teeth (No. of persons) | 1 | 0 | 0 | 16 | 15 |
| Insufficient resiliency | 0 | 0 | 0 | 11 | 1 |
| Excessive resiliency | 0 | 0 | 1 | 0 | 3 |
| Lacks smoothness | 0 | 0 | 0 | 19 | 0 |
| Excessively smooth | 0 | 0 | 1 | 0 | 10 |
| Too hard | 0 | 0 | 3 | 20 | 6 |
| Felt like raw wheat flour | 1 | 0 | 0 | 20 | 1 |
| Evaluation when eaten (points) | 9 | 10 | 8 | 2 | 4 |

*Equivalent to Example 1.

The above table illustrates the advantage in adjusting the water content of the mixture at between 25–40% by weight.

EXAMPLE 4

The procedure of Example 1 was repeated to obtain instant-cooking dry macaroni except that the length of the time of the preliminary steaming was varied to vary the α-conversion degree in the mixture as shown in the top line in Table 3. The result of test of resulting respective products is shown in Table 3.

TABLE 3

| α-conversion degree after preliminary steaming (%) | Present Invention | | | Control | |
|---|---|---|---|---|---|
|  | 60 | *70 | 80 | 50 | 90 |
| Degree of inter-piece sticking | none | none | none | very many | none |
| Sticks to teeth (No. of persons) | 1 | 0 | 0 | 11 | 0 |
| Insufficient resiliency | 0 | 0 | 0 | 6 | 0 |
| Excessive resiliency | 0 | 0 | 0 | 0 | 8 |
| Lacks smoothness | 1 | 0 | 0 | 4 | 0 |
| Excessively smooth | 0 | 0 | 0 | 0 | 3 |
| Too hard | 0 | 0 | 1 | 0 | 6 |
| Felt like raw wheat flour | 0 | 0 | 0 | 7 | 0 |
| Evaluation when eaten (points) | 9 | 10 | 9 | 3 | 5 |

*Equivalent to Example 1.

As will be apparent from the result shown above, the α-conversion degree after preliminary steaming needs to be 60–80%.

EXAMPLE 5

The procedure of Example 1 was repeated and this time spaghetti and vermicelli were obtained. The configuration of the extrusion nozzle was suitably changed. For spaghetti a nozzle with a bore diameter of 1.4 mm was used and for vermicelli a 0.9 mm nozzle was used.

The result of the testing of these products is shown in Table 4.

TABLE 4

|  | Spaghetti | Vermicelli |
|---|---|---|
| Degree of inter-piece sticking | none | none |
| Stick to teeth (No. of persons) |  |  |
| Short of resiliency | 0 | 0 |
| Excessive resiliency | 0 | 0 |
| Short of smoothness | 0 | 0 |
| Excessively smooth | 0 | 0 |
| Too hard | 0 | 0 |
| Felt like raw wheat flour | 0 | 0 |
| Evaluation when eaten (points) | 10 | 10 |

The above result clearly shows that the products of our invention are invariably good with respect to inter-piece sticking, ability to transform into an edible state when immersed in hot water as well sense "bite" or, mouth feel and taste.

EXAMPLE 6

The procedure similar to Example 1 was carried out to obtain the instant-cooking dry macaroni shown in Table 5 excepting that the steaming time was varied, that the final drying temperature was set at 130° C., and that the respective α-conversion degrees after the preliminary steaming and after the final drying were varied as shown in Table 5.

TABLE 5

| α-conversion degree after preliminary steaming (%) | 63 | | | 78 | | |
|---|---|---|---|---|---|---|
| α-conversion degree of final product (%) | 79 | 85 | 93 | 82 | 86 | 93 |
| Preliminary steaming time (min.) | 2 | 2 | 2 | 7 | 7 | 7 |
| Further steaming time (sec.) | 60 | 200 | 250 | 60 | 120 | 150 |
| Stick to teeth (No. of persons) | 11 | 1 | 0 | 12 | 1 | 0 |
| Short of resiliency | 13 | 1 | 0 | 10 | 0 | 0 |
| Excessive resiliency | 0 | 0 | 0 | 0 | 0 | 0 |
| Short of smoothness | 8 | 0 | 0 | 7 | 2 | 0 |
| Excessively smooth | 0 | 0 | 0 | 0 | 0 | 0 |
| Too hard | 0 | 0 | 0 | 0 | 0 | 0 |
| Felt like raw wheat flour | 16 | 1 | 0 | 12 | 1 | 0 |
| Evaluation when eaten (points) | 4 | 8 | 10 | 5 | 8 | 10 |

As is clear from the result shown in Table 5, the α-conversion degree after the final drying is 85% or more, preferably at least 93%.

EXAMPLE 7 AND CONTROLS D-H

In order to more fully elaborate the macaroni-type products of the present invention as well as to compare same with various prior patents the following experiments were conducted. Comparisons were made and conclusions drawn evidencing the physically measurable, optically observable and sensing differences as between the products of our invention and those produced by earlier procedures. These experiments will be explained below on the basis for various tables, charts and appended electron photomicrographs.

The following patent disclosures were used for these comparisons: Control F is based upon the processing conditions stated in U.S. Pat. No. 3,718,480 to Tremblay et al; Control G follows Example 2 of U.S. Pat. No. 3,846,563 to Cunningham; and Control H is based upon modified Example A of U.S. Pat. No. 2,677,613 to Shiah. Control D follows the procedure of Example 7 but omits the pre-steaming step while Control E omits all steaming steps.

In Example 7, which is according to the present invention, 78 parts of wheat flour was mixed with 22 parts water without kneading to evenly distribute the components. This mixture was pre-steamed for 5 minutes at a gauge pressure of 1 kg/cm² to give an α-conversion of about 70%. Thereafter the steamed mixture was extruded through an annular nozzle for macaroni (outer diameter 5.5 mm and inner diameter 4.5 mm), and the pieces cut into 25 mm lengths. A further steaming was conducted on the extruded pieces for 5 minutes at a gauge pressure of 1 kg/cm² then the molded pieces were air dried at 90° C. for 12 minutes. The overall degree of α-conversion was measured using the above-described procedure and found to be 93.1%. The procedure and other relevant information is given in Table 7 below.

Controls D-H, not according to the invention, were processed in the manner set forth in the flow chart of Table 7. All of the products were extruded (except for Control H which could not be extruded) to provide an interior cavity in the resulting product for purposes of comparison as between the various products. The essential starch-containing component of the starting materials and observation as to workability of each experiment is given in Table 6.

TABLE 6

|  | Example 7 | Control D | Control E | Control F | Control G | Control H |
|---|---|---|---|---|---|---|
| Main starting material other than water | Wheat flour | Wheat flour | Wheat flour | Wheat flour | Gelatinized wheat flour | Wheat flour |
| Workability during manufacture | Good | Fair | Fair | Fair | Poor | Impossible |

TABLE 7

|  | Example 7 | Control D | Control E |
|---|---|---|---|
| Manufacturing procedure | Present invention | Same as Example 7, except omission of preliminary steaming | Omission of both preliminary and further steaming steps. Other steps |

TABLE 7-continued

| | | | before extrusion. | are similar to Example 7. |
|---|---|---|---|---|
| Starting material Composition | Wheat Flour 78.0 parts<br>Water 22.0 parts | | As Example 7 | As Example 7 |
| Manufacturing conditions | Mixing | 15 min. | Mixing 15 min. | Mixing 15 min. |
| | ↓ | | ↓ | ↓ |
| | Preliminary steaming | Pressure 1.0kg/cm² for 5 min. | | |
| | ↓ | | ↓ | ↓ |
| | Extrusion | Nozzle for macaroni: diameter: φ5.5mm, φ4.5mm | Extrusion Nozzle for macaroni: Same as Example 7 | Extrusion Nozzle for macaroni: Same as Example 7 |
| | ↓ | | ↓ | ↓ |
| | Cutting | Length: 25mm | Cutting Length: 25mm | Cutting Length: 25mm |
| | ↓ | | ↓ | ↓ |
| | Further steaming | Pressure 1.0kg/cm² for 5 min. | Steaming Pressure 1.0kg/cm² for 5 min. | |
| | ↓ | | ↓ | ↓ |
| | Drying | Temp. 90° C. for 12 min. | Drying Temp. 90° C. for 12 min. | Drying Temp. 100° C. for 10 min. |

| | Control F | Control G | Control H |
|---|---|---|---|
| Manufacturing procedure | Followed the manufacturing conditions stated in specification of U.S. Pat. No. 3,718,480 | Followed Example 2 of U.S. Pat. No. 3,846,563 | Followed Example A of U.S. Pat. No. 2,677,613 |
| Starting material Composition | Wheat flour (Durum) 38.5 parts<br>Wheat flour (Suisha) 38.5 parts<br>Water 23.0 parts | α-converted wheat flour 48.3 parts<br>Wheat flour (Durum) 12.1 parts<br>Salt 3.4 parts<br>Water 36.2 parts | Wheat flour (Durum) 48.1 parts<br>Foaming agent (Bistop) 3.0 parts<br>Salt 0.8 parts<br>Water 48.1 parts |
| Manufacturing conditions | Mixing 10 min.<br>↓<br>Extrusion Nozzle for macaroni: diameter: φ3.5mm, φ2.6mm<br>↓<br>Cutting Length: 28mm<br>↓<br>Preliminary drying Temp. 60° C. Air speed: 2-3 m/sec for 1'45"<br>↓<br>Microwave drying Freq: 2450MHz Load: 590g/lot for 8min. | Mixing 5 min.<br>↓<br>Extrusion Nozzle for macaroni: Same as Control F<br>↓<br>Cutting Length: 30mm<br>↓<br>Drying Temp. 116° C. Air speed: 6m/sec for 15 min. | Mixing 5 min.<br>↓<br>Maturing 35° C., 2 hrs.<br>↓<br>Extrusion: Nozzle for macaroni: not possible Same as Control F<br><br>(no product) |
| Remarks | | Due to large amount of water added, remarkable mutual sticking of macaroni pieces was noted during extrusion, difficult to manufacture. | High water content of dough after maturing caused extrusion impossible, even with dusting up to 120% |

In Table 7 the ingredients in the starting material compositions are in parts by weight and the total parts for each composition was 100. In Control G due to the large quantity of water added a considerable amount of sticking together of the macaroni pieces was noted during the extrusion and a sample product could not be obtained. Similarly in Control H the mixture could not be extruded due to the quantity of water added.

Each of the products so produced was grossly observed and photographed under the electron micloscope; attached FIGS. 1-10 are photographs of these products. All of these photographs are at a magnification of 300.

Figure 2:
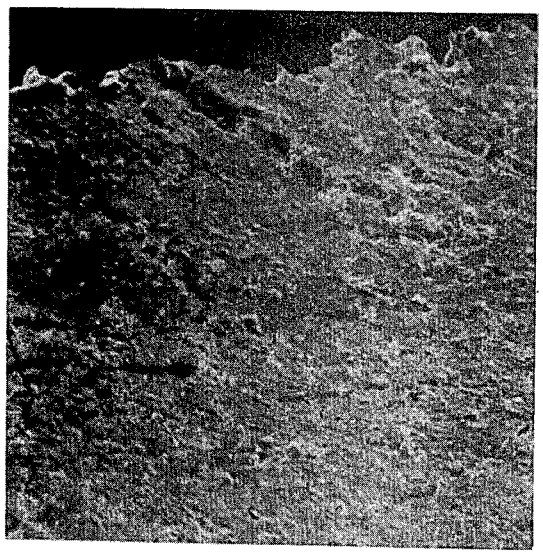

In FIG. 1 of the external surface of the product obtained in Example 1, a large number of randomly distributed pores of substantial size are seen, while starch particles are not observed on the surface of the product. In FIG. 2 of Example 1, the cross-sectional view shows pores extending deep into the surface of the product. Also, a phenomenon similar to that in Example 1 was observed in Example 7.

Figure 3:
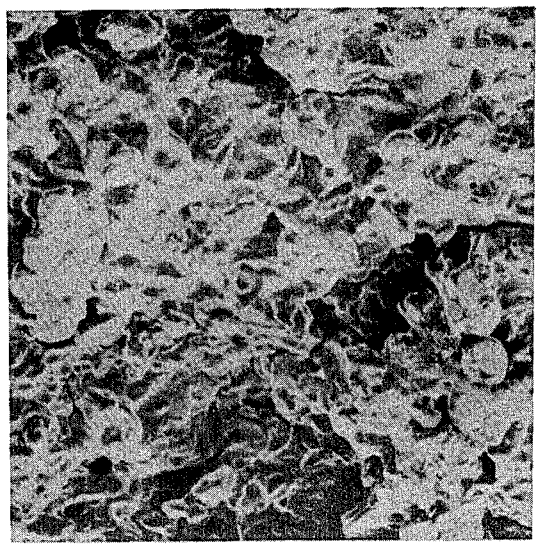
FIGS. 3–10 are electron microscopic photographs, showing the external surfaces and cross-sections of the products obtained in Controls D-H. All of the photographs are at a magnification of 300.
Figure 4:
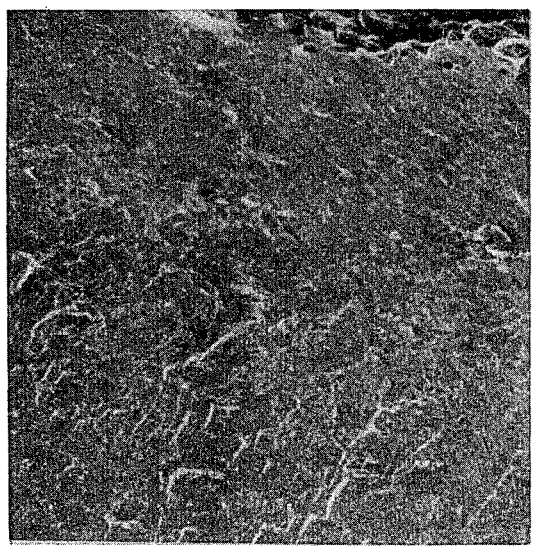

In FIG. 3, the product of Control D, the procedure omitting the preliminary steaming step, shows only a few pores, and several larger circles or pieces of starch particles. In FIG. 4, the cross-section shows that the pores are independent and there is no interconnection between the pores.

Figure 5:
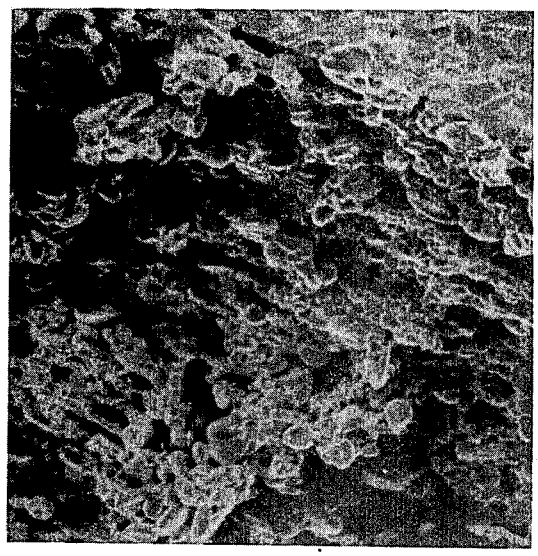
Figure 6:
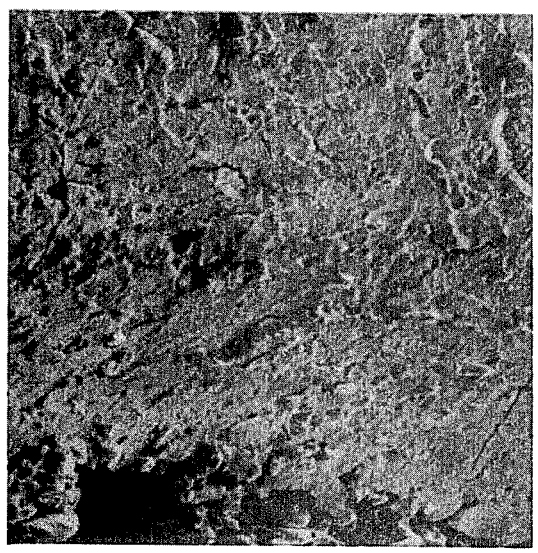

In FIG. 5, the external surface of the product of Control E in which no steaming was used shows several pores of a fairly large diameter as well as an equal or greater number of starch particles distributed about the surface. The cross-sectional view of the same product as shown in FIG. 6 shows an absence of interconnecting pores and indicates that the surface pores do not extend into the interior of the product.

Figure 7:
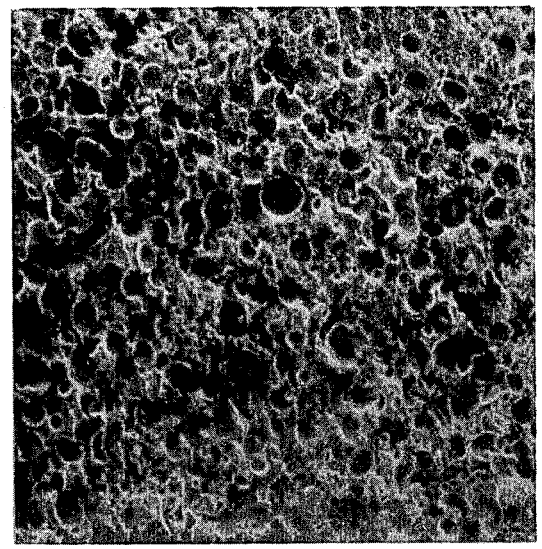
Figure 8:
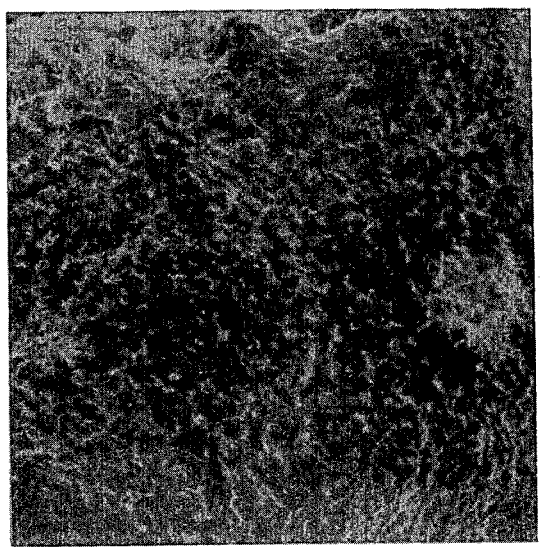

A large number of starch particles are seen on the surface of the product of Control F in FIG. 7 with only a few surface pores which do not extend into the interior of the product; see FIG. 8.

Figure 9:
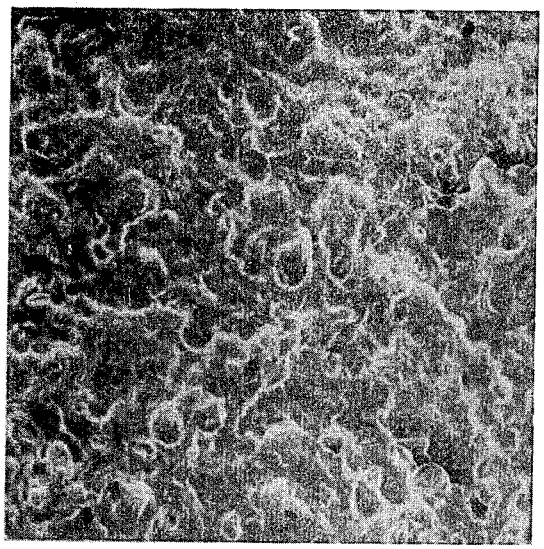
Figure 10:
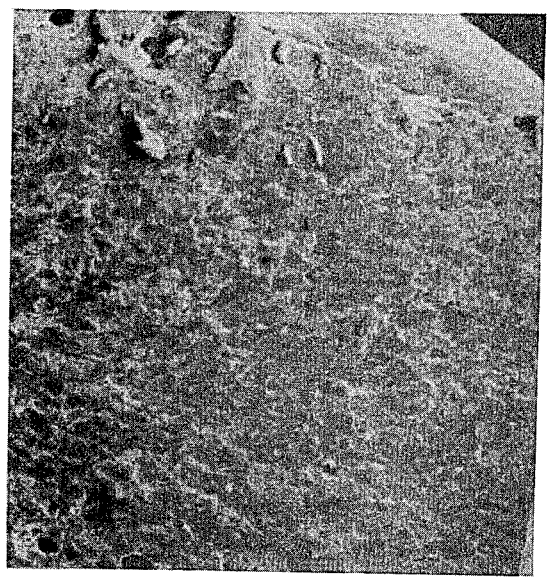

The product of Control G consisted of a mass of macaroni pieces mostly adhered to one another and while suitable discrete particles were not obtained as such photographs were taken. In FIG. 9 only a few surface pores are noted while much larger starch granules appear on the surface. Only a few independent (that is, not interconnected) pores are shown in the cross-sectional view of FIG. 10.

Next the product of Example 7 was compared with those of Controls D-G (Control H was omitted as the mixture could not be extruded hence no product was produced) and the comments relating to these observations plus the testing evaluation when rendered to the edible state are given in Table 8.

TABLE 8

|  | Example 7 | Control D | Control E | Control F | Control G |
| --- | --- | --- | --- | --- | --- |
| α-conversion degree % | 93.1 | 83.3 | 38.5 | 34.8 | 86.0 |
| Finding on electromicroscopic picture: Pore configuration | Presence of a large number of pores having large diameters. These pores extend deep into interior of product | Few pores and they are independent of each other | Presence of a number of pores having relatively large diameters. These pores do not extend deep into interior of product | Pores are small and few, and they are independent with each other. | Pores are small and few, and they are independent with each other. |
| Residual starch particles | No residual starch particles are noted. | Presence of a large number of residual starch particles (This product experienced only secondary steaming). | Presence of a large number of residual starch particles (This product is given no 1st and 2nd steaming). | Presence of a very many residual starch Particles. | Presence of a large number of residual starch |
| Appearance of noodles (how well molded) | G | G | G | SP | P |
| Stick to teeth (No. of persons) | 0 | 17 | 19 | 10 | 18 |
| Short of resiliency " | 0 | 13 | 18 | 14 | 6 |
| Excessive resiliency " | 0 | 0 | 0 | 0 | 0 |
| Short of smoothness " | 0 | 15 | 18 | 14 | 11 |
| Excessively smooth " | 0 | 0 | 0 | 0 | 0 |
| Felt like raw wheat flour | 0 | 16 | 20 | 18 | 5 |
| Felt like raw wheat flour |  |  |  |  |  |
| Strange odor " | 0 | 2 | 5 | 2 | 1 |
| Evaluation when eaten (points) | 10 | 3 | 1 | 3 | 5 |

Note:
G represents Good
SP represents Slightly Poor
P represents Poor

These comparisons and the appended photographs demonstrate the differences between the products of the present invention and those products resulting from other procedures.

What is claimed is:

1. An instant-cooking dry macaroni-type product convertible to a cooked and edible state within a short period of time when immersed in hot water, said product characterized by,
   a network of interconnected large-diameter pores communicating between the external surfaces of the product and the internal portions thereof,
   consisting essentially of at least one starch-containing component selected from wheat flour or wheat flour mixed with other grain flours, starches or both,
   the starch contained therein having an alpha-conversion degree of at least 85% as measured by a diastase enzyme process,
   storage stable for a period of at least one year without substantial change in product quality,
   discrete, individual macaroni-shaped pieces that are free from substantial portions of the product sticking to adjacent pieces of the product, the product readily converted to a cooked, non-sticky macaroni-shaped type product having good feel, sense and taste when transformed into the edible state.

2. The macaroni-type product of claim 1 having a surface substantially completely devoid of residual starch particles.

3. The macaroni-type product of claim 1 or 2 containing sodium chloride in an amount not exceeding 8% by weight relative to the weight of the starch-containing component.

4. Instant-cooking dry macaroni products having a water content of 13% or less by weight, consisting essentially of at least one starch-containing component selected from wheat flour or wheat flour mixed with other grain powders, starches or both, the starch contained therein having an α-conversion degree of at least 85% as measured by a diastase enzyme process, said products having a fine porous texture providing communication between the external surfaces of said products with the interior portions thereof by network of interconnected fine pores, and being capable of transformation into an edible cooked state within a short period of time when immersed in hot water, said products being storage stable sufficient to withstand storage for a period of time of at least one year without substantial change in product quality, devoid of portions sticking to adjacent pieces of said products, and yielding a non-sticky good sense, feel and taste when transformed to the edible cooked state when immersed in hot water.

5. Instant-cooking dry macaroni products according to claim 4 containing sodium chloride in an amount not exceeding 8% by weight relative to the weight of said starch-containing component.

6. Instant-cooking dry macaroni products according to claim 4 or 5 in which said products contains an effective amount of at least one of a food-quality improving agent, a seasoning agent, and a viscous binding agent.

7. Instant-cooking dry macaroni products according to claim 4, 5 or 6 wherein the pores at the surface of said products have an average diameter of from about 5 to about 20 microns.

8. The macaroni-type product of claim 1 wherein the degree of α-conversion is at least about 93%.

9. An instant-cooking dry macaroni product having a water content of 13% or less by weight, containing sodium chloride in an amount not exceeding 8% by weight and consisting essentially of at least one starch-containing component selected from wheat flour or wheat flour mixed with other grain powders, starches or both, the starch contained therein having an α-conversion degree of at least 85% as measured by a diastase enzyme process, said product having a fine porous texture providing communication between the external surfaces of said products with the interior portions thereof by network of interconnected fine pores, the pores at the external surface of said product having an average diameter of from about 5 to about 20 microns, and being capable of transformation into an edible cooked state within a short period of time when immersed in hot water, said product being storage stable sufficient to withstand storage for a period of at least one year without substantial change in product quality, devoid of portions sticking to adjacent pieces of said products, and yielding a nonsticky good sense, feel and taste when transformed to the edible cooked state when immersed in hot water.

10. The instant-cooking dry macaroni product of claim 9 wherein the degree of α-conversion is at least about 93%.